Figure 1:
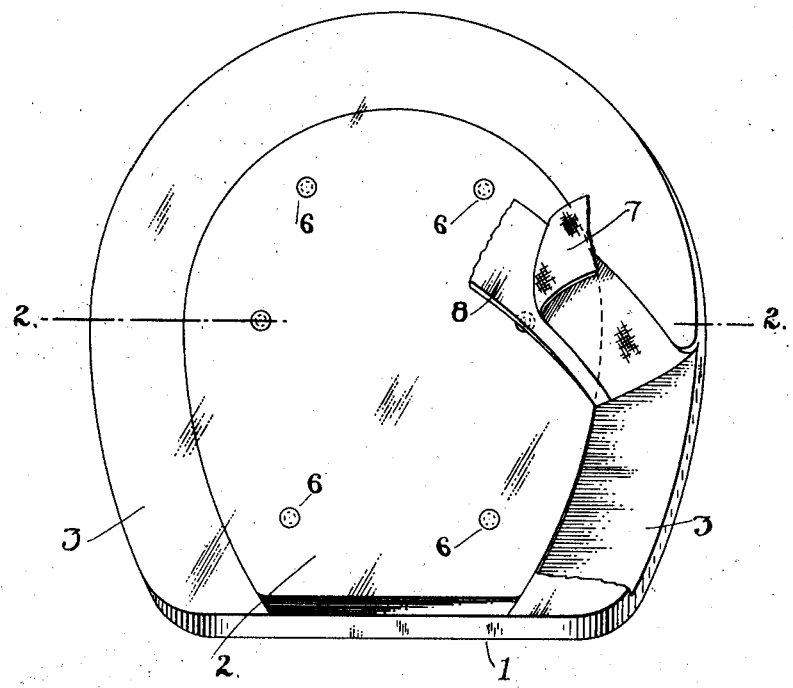

W. J. KENT.
HOOF PROTECTOR.
APPLICATION FILED SEPT. 10, 1918.

1,338,986.

Patented May 4, 1920.

Inventor.
William J. Kent,
By his Attorney.
Ernest H. Hopkinson

UNITED STATES PATENT OFFICE.

WILLIAM J. KENT, OF BROOKLYN, NEW YORK, ASSIGNOR TO THE MECHANICAL RUBBER COMPANY, A CORPORATION OF NEW JERSEY.

HOOF-PROTECTOR.

1,338,986.     Specification of Letters Patent.     Patented May 4, 1920.

Application filed September 10, 1918. Serial No. 253,354.

*To all whom it may concern:*

Be it known that I, WILLIAM J. KENT, a citizen of the United States, residing in the borough of Brooklyn, city of New York, county of Kings, and State of New York, have invented certain new and useful Improvements in Hoof-Protectors, of which the following is a full, clear, and exact description.

This invention relates to hoof protectors and more particularly to protectors of the type adapted to be interposed between the shoe and the hoof of the animal for the purpose of preventing injury to the hoof.

Heretofore cushion pads have been used embodying a yieldable flat body portion upon which is superposed a metal plate or shield adapted to prevent rocks and other hard bodies from wounding the under portion of the hoof of the animal. Such pads do not afford a level surface on which to fit the shoe due to the projection of the metal shield above the body portion, and as a result considerable warping and distortion of the pads occurs in service. This distortion has proved particularly objectionable in war service as it results in the formation of openings through which mustard gas and other deleterious substances may freely pass to the inner portion of the hoof of the animal causing serious injury and oftentimes death.

An object of the present invention accordingly is to provide a hoof protector of simple and economical construction adapted to efficiently protect the hoofs of animals from injury by rocks and other hard bodies and from the deleterious action of mustard gas and other substances.

With this and other objects in view which will hereinafter readily appear, the invention consists in the novel construction, combination, and arrangement of parts hereinafter more particularly described and claimed.

A practical embodiment of the invention is set forth in the accompanying drawings forming a part of this specification, in which similar characters of reference indicate corresponding parts in all the views.

In the drawings:—

Figure 2:
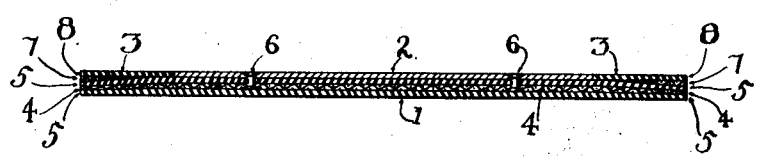

Figure 1 is a perspective view with portions cut away and laid back illustrating one embodiment of the invention; and Fig. 2 is a sectional view taken substantially on the line 2—2 of Fig. 1.

The hoof protector illustrated in the drawings comprises a flexible body member 1 corresponding in general contour to the outline of the bottom of a horse's hoof, and a flat metal plate or shield 2 of similar outline to the body member but of lesser area. The metal shield is embedded flush with the ground face of the body member to which it is applied, so that the protector is of substantially uniform thickness throughout, affording a level surface on which to fit the horseshoe. By referring to the drawings it will be seen that the outer margin of the metal shield is spaced in from the outer margin of the body member to provide the protector with a marginal portion 3 adapted to be readily penetrated by nails, screws or other horseshoe retaining devices.

In manufacturing the hoof protector a flat blank composed of a layer of fabric 4 interposed between two lays of leather and rubber compound 5 is first prepared. This blank is made of a size and shape to completely cover the bottom of a horse's hoof. The metal plate or shield 2 is then secured to the ground face of the blank by rivets 6. In order to make the body member level with the outer face of the shield a second blank, having substantially the form of a horseshoe is cut from a sheet formed of a layer of fabric 7 and a layer of leather and rubber compound 8. This blank is superposed upon the blank first prepared, and is of a thickness substantially the same as that of the metal plate thus making the ground face of the protector substantially level, so that the shoe when secured in place may lap over the adjoining edges of the metal plate and the second blank or filler. When the parts have been assembled as set forth they are vulcanized while subjected to pressure between suitable plates or platens. During the vulcanizing process the layer of rubber compound 8 is sealed to the edge of the shield.

Although the body member has been described as formed of layers of fabric and rubber and leather compound, it is to be understood that it may be constructed of any suitable fluid or gas impervious material. It is also to be understood that the metal plate or shield may be embedded in the body member in any suitable manner.

The improved protector is of substantially uniform thickness throughout providing a level surface on which to fit the horseshoe and is adapted to maintain a gastight fit with the bottom of the hoof and the horseshoe under all conditions of service, thus effectively protecting the hoof of the animal to which it is applied from the deleterious action of mustard gas and other injurious substances encountered in warfare. The protector is further adapted to prevent injury to the hoof by rocks or other hard bodies. When the protector is used in warfare, the openings existing at the back of the horse's hoof between the protector and the frog may be plugged up with oakum or other suitable material.

While one of the preferred embodiments of the invention has been set forth, it is to be understood that various modifications in form, material, and arrangement of parts may be resorted to without sacrificing any of the advantages of the invention defined in the appended claims.

Having thus described my invention what I claim and desire to protect by Letters Patent is:—

1. A hoof protector embodying a body member of yieldable material shaped to cover the bottom of the horse's hoof, a metal shield plate secured to the ground face of said body member of less area than the body member thereby providing a depressed margin of yieldable material for the reception of the horseshoe nails, and a filler of yieldable material secured upon said depressed margin so that the abutting edges of the shield plate and filler may be engaged by the shoe.

2. A hoof protector embodying a body member of yieldable material adapted to cover the bottom of the horse's hoof, a metal shield plate secured to the ground face of said body member of less area than the body member thereby providing a depressed margin of yieldable material for the reception of the horseshoe nails, and a filler of yieldable material secured upon said depressed margin and of sufficient thickness to extend flush with the surface of said plate so that a shoe when secured in place may lap over the adjoining edges of the metal plate and filler.

3. A hoof protector embodying a body member of yieldable material adapted to cover the bottom of the horse's hoof, a metal shield plate secured to the ground face of said body member of less area than the body member thereby providing a depressed margin of yieldable material for the reception of the horseshoe nails, and a filler of yieldable material secured upon said depressed margin, to form a level surface with the shield plate so that a shoe when secured in place may lap over the adjoining edges of the metal plate and filler, said base being vulcanized to said filler and plate.

4. A hoof protector embodying a body member of yieldable material adapted to cover the bottom of the horse's hoof, a metal shield plate secured to the ground face of said body member of less area than the body member but of greater area than the space within the shoe with which it is adapted to coöperate to provide a metallic exposed surface throughout the entire area of the hoof, and a yieldable filler secured to the margin of the base member beyond the plate.

5. A hoof protector comprising a body member formed of a compact vulcanizable material and of a size sufficient to cover the entire hoof, a metal shield plate secured to the ground face of the body member and of a size intermediate the interior and exterior outlines of the shoe, whereby a readily perforable margin is provided for the nails, and a filler for said margin having its outer surface flush with said plate, said parts being united by vulcanization into a fluidtight whole.

Signed at New York city, this 30th day of August, 1918.

WILLIAM J. KENT.